Figure 2:
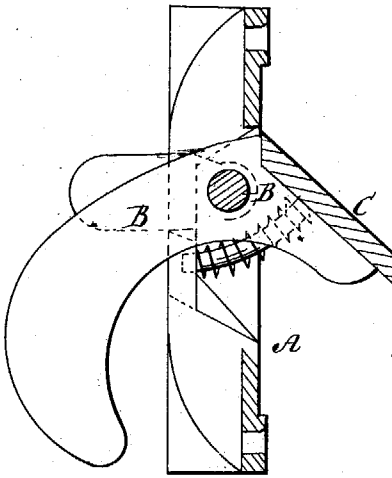
Figure 1:
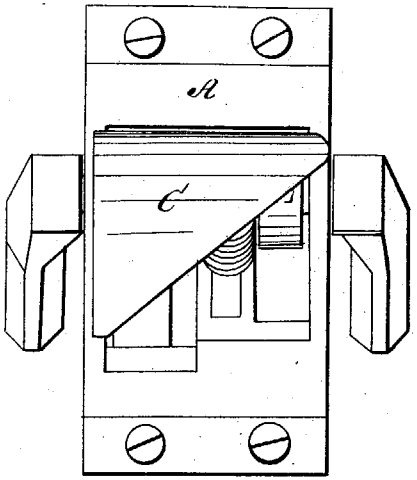

J. A. Park,

Gate Latch.

No. 2,976. Reissued June 9, 1868.

N. PETERS, PHOTO-LITHOGRAPHER, WASHINGTON, D. C.

United States Patent Office.

JAMES A. PARK, OF WHITE HOUSE, NEW JERSEY.

*Letters Patent No.* 62,061, *dated February* 12, 1867; *reissue No.* 2,976, *dated June* 9, 1868.

IMPROVEMENT IN DOOR AND GATE-LATCHES.

The Schedule referred to in these Letters Patent and making part of the same.

TO ALL WHOM IT MAY CONCERN:

Be it known that I, JAMES A. PARK, of White House, in the county of Hunterdon, and State of New Jersey, have invented a new and improved Self-Acting Gate or Door-Latch; and I do hereby declare that the following is a full, clear, and exact description thereof, reference being had to the accompanying drawings, forming a part of this specification, and to the letters of reference marked thereon.

This invention consists of a novel and improved form of latch, which may be made of wood or metal, according to the size desired, and the place in which it is to be used. It is adapted to use on gates or doors of any size, as it may be constructed of any size. It is a simple, cheap, and efficient latch, self-adjusting, with or without the use of springs as an aid, or independent. In its use on gates or out-building doors, liable to sag, it is particularly efficient and lasting. In its use on inside house-doors it excels, especially on doors liable to well and shrink; they may also be closed with greater ease.

In the annexed drawings, A represents a metallic plate, to which the latch is connected, and by means of which the latch is secured to the gate, door, or post to which it is to be applied. This plate is provided with screw-holes, to thereby secure it perpendicularly in its place of use; also, with three slots or openings through it, near its centre, (the uses of which will appear hereinafter,) and also with two lugs or ears, in which openings or journal-boxes are formed for the reception of the latch-shaft.

B represents the latch-shaft, which forms a part of the latch, or is so secured that it acts as a part of it, and has its bearings in the ears, above described, in the plate A. The ends of the shaft B may be allowed to project to receive the knobs, as shown in the drawings.

C represents the latch, as is shown in the drawings, in triangular form. (However, the line forming the hypothenuse of the triangle may curve either inward or outward from the extremity of its base and perpendicular.) This latch is provided with two lugs or ears on its inner surface, at the base of its triangle, (allowing the centre of the shaft B to be the base.) These ears are provided with openings, into which the latch-shaft is secured, when the latch-shaft is not cast on the latch. One of these ears is extended, or has cast upon it a metallic weight of its own substance, which is shown in the drawings, in curved form, but may be of any form to suit in the place in which it is to be used.

This weight may be cast upon either ear, or even upon the shaft B, but, in any case, it must be heavy enough to overbalance the latch C, to operate it independently. This weight part, if made in proper shape, (long,) will act as well cast on the extremity of the lower end of the latch.

D, in the drawings, represents the weight.

On the inner side of the latch C, a pin may be cast, as shown in the drawings, which plays through a slot, spoken of, in the plate A, and around which is a spiral or other spring, which will operate the latch as an aid, or independent of any weight, by pressing the lower extremity of the latch from the plate A, thereby angling it, from the post to which it is hung, as much as is needed.

The latch has its edge bevelled, so as to allow the door to close easily, as the latch, being thus bevelled, is easily pushed to a perpendicular with the post on which it is hung, and thereby allow the door to pass to its place, at which time the latch is caused to fall or spring in position to hold it shut.

In many cases the plate A may be dispensed with, and ordinary staples driven into the post, to form bearings for and in which the shaft B may work, as will readily be seen.

The knobs, when secured on the shaft C, when allowed to project, as shown in the drawings, will of themselves act also as weights, and, if heavy enough, will dispense with any other aid in the operation of the latch. Almost any kind of arrangement will answer, behind which the latch must catch to hold the arrangement shut, and upon which it operates a mortise, in which may catch a bevelled strip of iron or board, covered with sheet iron, bevelled so as to allow the latch to pass easily, or, if a mortise is used, the part behind which it catches must be bevelled, and covered with sheet iron or other hard substance, to prevent the wood from wearing away, where it comes in direct contact with the latch, by constant use.

Any spring may be used in place or instead of the spiral spring, above described, for the purpose of aiding in moving the latch C.

Having thus fully described my invention, what I claim as new, and desire to secure by Letters Patent, is—

The angular latch C, constructed substantially as described, secured upon a suitable rock-shaft, B, and operated in one direction, either by means of a weighted handle upon said shaft, or by means of a spring, as and for the purpose herein specified.

In testimony that I claim the foregoing, I have hereunto set my hand, this 15th day of November, 1867.

JAMES A. PARK.

Witnesses:

H. B. ARMES,

J. B. PARK.